No. 641,939. Patented Jan. 23, 1900.
C. S. COX & T. E. LANGLEY.
RAISIN SEEDER.
(Application filed Aug. 1, 1899.)

(No Model.)

WITNESSES:

INVENTORS

BY

ATTORNEYS

UNITED STATES PATENT OFFICE.

CARY S. COX AND THOMAS E. LANGLEY, OF FRESNO, CALIFORNIA.

RAISIN-SEEDER.

SPECIFICATION forming part of Letters Patent No. 641,939, dated January 23, 1900.

Application filed August 1, 1899. Serial No. 725,744. (No model.)

*To all whom it may concern:*

Be it known that we, CARY S. COX and THOMAS E. LANGLEY, of Fresno, in the county of Fresno and State of California, have invented a new and Improved Raisin-Seeder, of which the following is a full, clear, and exact description.

One object of our invention is to simplify and perfect machines for seeding raisins, and particularly to improve upon the construction of the raisin-seeder for which application for patent was filed by Cary S. Cox January 28, 1899, Serial No. 703,678.

A further object of the invention is to provide a self-cleaning comb for removing the seed from the impaling-roller and to construct strippers particularly adapted to remove the seeded raisins from the impaling or carrying roller.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
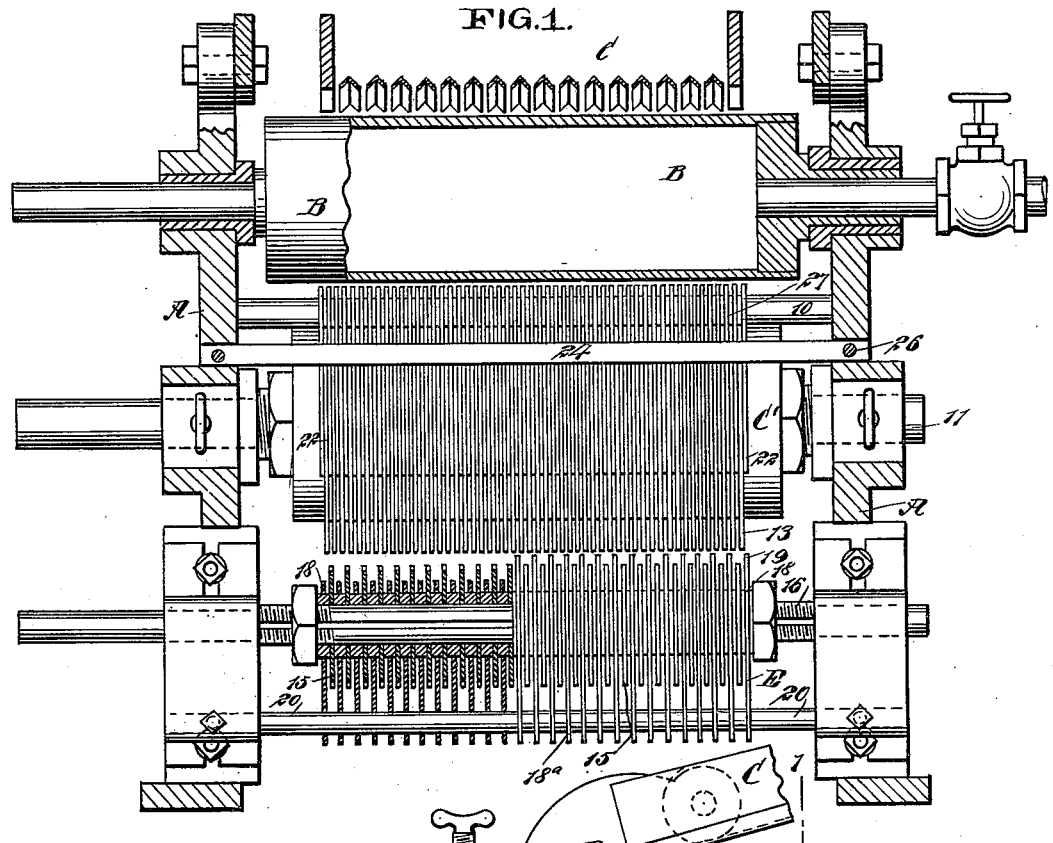
Figure 2:
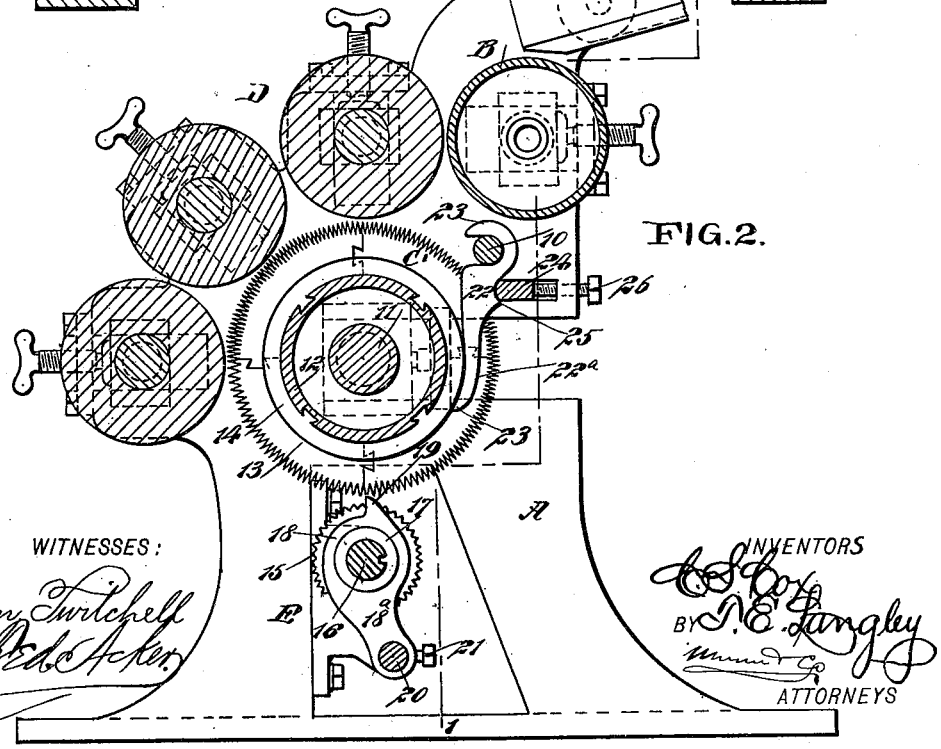

Figure 1 is a vertical section through a raisin-seeding machine having the improvements applied, the section being taken practically on the line 1 1 of Fig. 2; and Fig. 2 is a central vertical section through the machine.

The frame of the machine consists of two properly-spaced standards A, and in the upper portion of these standards the trunnions of a heating-roller B are mounted to turn in any suitable form of boxes. The heating roller or drum B is hollow and steam is supplied thereto in any suitable manner. The said press heating roller or drum B receives the raisins to be seeded as they come from a screen-trough C of any approved construction. Just below the roller or drum B a cross-bar or fixed shaft 10 is located, extending from one standard of the frame to the other, and at the central portion of the frame of the machine a main shaft 11 is mounted to rotate. This shaft 11 is provided with an impaling or carrying roller C', and said roller consists usually of a body 12, secured to the shaft in any suitable or approved manner, and serrated or toothed disks 13, that are attached to the body 12 and are properly spaced by washers 14. The impaling-teeth of the impaling-roller are spaced so as to exclude the seeds of the fruit, and elastic pressure-rollers D, or pressure-rollers having an elastic surface, are grouped around the impaling-roller C', acting to press the fruit below the surface of the said impaling-teeth, leaving the seeds on the points of said teeth.

In connection with the mechanism described or equivalent mechanism a self-cleaning comb E is employed, adapted to remove the seeds from the impaling-teeth of the impaling-roller C'. Therefore this comb is immediately below the impaling-roller and is mounted on a shaft 16, which shaft is adapted to revolve and is provided with suitable bearings located in the standards A of the frame. The said shaft is provided with a series of serrated or toothed disks 15, secured thereon by keys or otherwise, and these disks 15 are spaced by means of suitable washers or collars 17, likewise secured on the shaft 16, as shown best in Fig. 2. Strippers are located between the serrated disks, and said strippers are of less dimensions than the width of the collars or washers 17. Each stripper comprises a ring-like head 18 and a downwardly-extending shank 18ª, and the ring-head of each of the strippers is loosely mounted upon a collar or washer 17. Thus the shaft 16 and the collars and disks carried thereby may revolve, but the strippers remain stationary. Each stripper is provided with a tooth 19 at the central portion of its upper edge, and these teeth have one surface curved and the other opposing surface straight, the straight surfaces of the teeth of the strippers facing the impaling-teeth of the impaling-roller as said roller revolves. The teeth 19 of the strippers bear such relation to the impaling-teeth on the impaling-roller that the teeth of the strippers effectually remove the seeds from the impaling-teeth. The serrated disks 15 are of greater diameter than the exterior diameter of the ring-like heads of the strippers; but the teeth 19 of the strippers project beyond the teeth of the disks 15, as shown in Fig. 2. The serrated disks 15 of the improved comb are entirely out of contact or possible engagement with the impaling-teeth, the serrated disks 15 simply serving as cleaning-disks for the teeth 19 of the strippers. The strippers of the comb E are held stationary and in proper position by passing a rod 20 through suitable openings in the shanks 18ᵃ of said strippers, as is shown in both figures, each stripper where it receives the rod 20 having a set-screw 21. This construction and arrangement of the serrated disks out of contact with the teeth of the impaling-roller, with the strippers between the disks, not only removes the seed from the impaling-roller, but the short cap-stems on the raisins, the hard red berries, the nails, and other foreign matter are also effectually removed without injury to the impaling-roller, so common in other machines of this class. The projecting teeth of the strippers pull everything desired to be removed down to the serrated disks, and these disks in turn throw off the matter to be removed and keep the teeth of the strippers clean. Besides preventing much injury to the teeth of the impaling-roller from the foreign matter present this construction and arrangement also prevents the throwing off of a large percentage of good raisins, which happens in machines where the serrated disks are arranged sufficiently close to the teeth of the impaling-roller to remove the seed and foreign matter.

Pendent strippers 22 are employed to remove the seeded fruit from the impaling-roller. Each stripper 22 consists of a hook-shaped head 23 and an elongated body 22ᵃ. The heads 23 of the fruit-strippers are made to receive the fixed rod 10, while the body portions 22ᵃ of the fruit-strippers extend downward between the impaling-disks of the impaling-roller, the forward edges of the body portions of the fruit-strippers being preferably curved to conform partially with the cylindrical surfaces of the spacing-washers 14 of said impaling-roller, and the rear lower edge 23 of the body portion of each fruit-stripper 22 is rounded off in an upward direction. When the fruit-strippers are in position, as the impaling-roller revolves the lower ends of the fruit-strippers engage with the fruit that lies between the impaling-disks and force the seeded fruit out from the roller. The fruit-strippers 22 are adjustable with reference to the impaling-roller C', preferably by passing a bar 24 through suitable openings in the standards A of the frame, the said bar entering recesses 25, formed in the rear edges of the said fruit-strippers just below their heads 23, and the locking-bar 24 is held in suitable position by set-screws 26.

Having thus described our invention, we claim as new and desire to secure by Letters Patent—

1. In a machine for seeding fruit, an impaling-roller, a comb consisting of serrated disks mounted to revolve adjacent to the periphery of said impaling-roller, but out of contact with said roller and the seeds carried thereby, and strippers held stationary between the said disks and each provided with a projection extending in direction of the teeth of the impaling-roller and adapted to engage with the seed to be removed from the said roller, said serrated disks of the comb serving as cleaners for the strippers, as and for the purpose specified.

2. In a machine for seeding fruit, an impaling-roller, a comb adapted to remove seeds from said roller, said comb comprising a series of serrated disks mounted to revolve adjacent to the impaling-roller, but out of contact with said roller and the seeds carried thereby and strippers held stationary between the disks, the disks being of greater diameter than the portions of the strippers located between them, each stripper having a tooth extending beyond the peripheries of the disks in direction of the teeth of the impaling-roller and adapted to engage with the seed to be removed from the said roller.

3. In a machine for seeding fruit, the combination, with an impaling-roller, of a self-cleaning comb, said comb comprising a shaft mounted to revolve below the impaling-roller, serrated disks secured on said shaft, the serrated disks being far enough removed from the impaling-roller and its teeth so that they will not interfere with the teeth carried thereby, spacing-collars located between the said serrated disks and secured to the said shafts and strippers located between the various serrated disks, each stripper comprising a ring-like head loosely mounted on a spacing-collar and provided with a tooth extending in direction of the teeth of the impaling-roller, being adapted to engage with the seed carried by said roller, and means, substantially as described, for securing the lower portion of the said strippers, whereby the serrated disks serve as cleaners for the seed-removing teeth of the strippers.

4. In a machine for seeding fruit, an impaling-roller, a comb consisting of serrated disks mounted to revolve adjacent to the impaling-roller and strippers located between the serrated disks and each comprising a ring-like head, and a shank extending therefrom, the said head being provided with a tooth extending in direction of the impaling-roller and adapted to engage with the seed carried by said roller, a rod extending through openings in the shanks of the said strippers, and means for fastening the shanks to the rod.

5. In a machine for seeding fruit, the combination with an impaling-roller having a series of serrated disks, a shaft mounted to revolve adjacent to the impaling-roller, strippers for removing the seed from said impaling-roller, each stripper comprising a ring-like head through which the said shaft loosely extends and a shank extending from said head, the head of each stripper being provided with a tooth extending in direction of the impaling-roller and having one surface curved and the opposite surface straight, the said straight surface of the teeth facing the impaling-teeth of the impaling-roller as said roller revolves, means connected with the shanks of said strippers for holding the strippers stationary, and means carried by said shaft for cleaning the strippers.

6. In a machine for seeding fruit, the combination with an impaling-roller comprising a body, a series of serrated disks and a spacing device for the disks, of fruit-strippers each comprising a hook-shaped head and an elongated body, a fixed shaft extending adjacent to the impaling-roller and adapted to be engaged by the hook-shaped heads of the strippers, the body portion of the strippers extending downward between the disks of the impaling-roller, the said strippers being each provided with a recess below the head, and a device for engaging said recess to adjust the strippers.

7. In a machine for seeding fruit, a heating-roller, an impaling-roller comprising a body, a series of serrated disks, and spacing devices for the disks, a series of pressure-rollers, fruit-strippers having hook-shaped heads, and body portions extending between the serrated disks of the impaling-roller, a shaft engaged by the hook-shaped heads of the strippers and means for engaging the strippers below the hook-shaped heads to adjust the strippers to and from the said impaling-roller, substantially as described.

8. In a machine for seeding fruit, the combination with an impaling-roller comprising a body and a series of spaced toothed disks, of a stripping device for removing the seeds from the teeth of the impaling-roller, a series of pendent fruit-strippers having hook-shaped heads and body portions extending downward between the disks of the impaling-roller, a shaft engaged by the hook-shaped heads of the strippers whereby they are supported in the pendent position, a bar extending through slots in the machine-frame and adapted to engage the rear edge of said strippers below their heads, and means for adjusting the said bar, substantially as described.

CARY S. COX.
THOMAS E. LANGLEY.

Witnesses:
C. T. ELLIOTT,
S. L. HOGUE.